United States Patent
Hartman

(10) Patent No.: US 11,082,362 B2
(45) Date of Patent: Aug. 3, 2021

(54) DYNAMIC VIRTUAL GROUPS APPARATUSES, SYSTEMS, AND METHODS

(71) Applicant: California Eastern Laboratories, Inc., Santa Clara, CA (US)

(72) Inventor: James Paul Hartman, Canton, GA (US)

(73) Assignee: California Eastern Laboratories, Inc., Santa Clara, CA (US)

( * ) Notice: Subject to any disclaimer, the term of this patent is extended or adjusted under 35 U.S.C. 154(b) by 0 days.

(21) Appl. No.: 16/178,474

(22) Filed: Nov. 1, 2018

(65) Prior Publication Data
US 2020/0145347 A1  May 7, 2020

(51) Int. Cl.
| | |
|---|---|
| *H04L 12/927* | (2013.01) |
| *H04L 12/18* | (2006.01) |
| *H04L 12/911* | (2013.01) |
| *H04L 12/861* | (2013.01) |
| *H04L 12/24* | (2006.01) |

(52) U.S. Cl.
CPC .......... *H04L 47/806* (2013.01); *H04L 12/185* (2013.01); *H04L 41/12* (2013.01); *H04L 47/822* (2013.01); *H04L 49/90* (2013.01)

(58) Field of Classification Search
CPC ..... H04L 12/185; H04L 41/12; H04L 47/822; H04L 49/90; H04L 47/806
See application file for complete search history.

(56) References Cited

U.S. PATENT DOCUMENTS

| | | | |
|---|---|---|---|
| 2007/0177592 A1* | 8/2007 | Mooney | H04L 29/06027 370/390 |
| 2009/0168681 A1* | 7/2009 | Moon | H04W 72/005 370/312 |
| 2009/0245249 A1* | 10/2009 | Suzuki | H04L 12/18 370/390 |
| 2013/0279391 A1* | 10/2013 | Gupta | H04L 47/15 370/312 |
| 2015/0288733 A1* | 10/2015 | Mao | H04L 65/602 709/219 |
| 2016/0150537 A1* | 5/2016 | Jung | H04W 4/80 455/452.1 |
| 2018/0014387 A1* | 1/2018 | Bard | H05B 37/0218 |
| 2018/0076967 A1* | 3/2018 | Yang | H04L 12/185 |
| 2018/0183616 A1* | 6/2018 | Lee | H04W 28/10 |

FOREIGN PATENT DOCUMENTS

| | | | | |
|---|---|---|---|---|
| EP | 3327987 A1 * | 5/2018 | ......... | H04L 12/1881 |
| EP | 3327987 A1 | 5/2018 | | |
| WO | 2016046005 A2 | 3/2016 | | |

* cited by examiner

*Primary Examiner* — Shean Tokuta
*Assistant Examiner* — Juan C Turriate Gastulo
(74) *Attorney, Agent, or Firm* — Richard W. James

(57) ABSTRACT

A system, apparatus, and method for network traffic management. The method includes establishing a building zone corresponding with a physical space in the building, determining how many networked devices are in the building zone, determining a current multicast use level, establishing a virtual group threshold based on a current portion of a network multicast capacity that is being used, and unicast transmitting a message to a plurality of networked devices in the building zone when the number of networked devices in the building zone is less than the virtual group threshold.

18 Claims, 4 Drawing Sheets

DYNAMIC VIRTUAL GROUPS APPARATUSES, SYSTEMS, AND METHODS

CROSS-REFERENCE TO RELATED APPLICATIONS

None.

FIELD OF THE INVENTION

The present invention is concerned with managing network traffic. In particular, embodiments of the invention transmit multiple unicast messages in place of a multicast message.

BACKGROUND OF THE INVENTION

Computer automated control systems often send control messages across a network to actuate controlled apparatuses in those networks. Moreover, frequently a large number of scheduled event messages are retrieved from a data storage device and transmitted across such a network in a short period of time. For example, if lights are to be energized or de-energized at a scheduled time, scheduled event messages may be read for each lighting fixture or bank of fixtures that are controlled together. In addition, an operational control message may be sent across the network to each lighting fixture or bank of fixtures that are controlled together to actuate the lights scheduled to be energized or de-energized. In a large building where many areas, such as lobbies and common areas, are to be lit at one particular time, many scheduled event messages may be read and many control messages may be sent across the network at a time or during a short period of time.

When a large, wireless mesh-networked system is managed and controlled by, for example, a resource-limited, single flow embedded processing system, inefficiencies can arise that impact overall system performance and user experience.

Inefficiencies in such a system may occur when a large number of messages of a particular type are being sent over the network. When too many messages of a particular type are sent across the network, the network may become congested and operate inefficiently, message delivery may be delayed, network queues may overflow, thereby losing messages, messages may otherwise be lost and fail to be delivered by the network as required, and users may experience delays or failures in system operation.

There exists a layer of software in many networking systems that manages the transmission and receipt of messages. For example, a ZigBee or Bluetooth software stack is a layer of software that sends and receives messages, including unicast messages (directed to a single device) and multicast messages (directed to one or more devices). Since multicast messages are generally sent to more than one device, it is common in a mesh network for a multicast packet to be retransmitted by multiple nodes to ensure all destination nodes in the system receive the packet. Having multiple nodes retransmit each multicast packet helps ensure that all destination devices in the multicast operation receive the multicast packet.

Each multicast packet has high overhead due to the multiple transmissions that can result as multiple nodes retransmitting each packet. For example, to avoid resending a multicast packet too many times, each node must typically track which multicast packets it has retransmitted, often using a multicast table to store information relevant to each repeated transmission. A multicast table retains this information for a certain time. The size of the multicast table limits how many concurrent broadcast packets a device can send and monitor. If the multicast table is full on a node such that all entries in the table are storing information for multicast packets, then that node will not be able to store information for any additional multicast packets until an entry is made available in the table.

Due to limitations in the size of a multicast table, it is possible for an application to attempt to transmit more multicasts than can fit in the table. This can lead to having multicast packets not be received by all devices, or having the multicast packets be sent in unpredictable bursts over time. For example, if a node has 15 entries in its multicast table, and there are 8 multicast transmissions already taking place such that 8 of the 15 entries are being used, and if a device needs to send 10 additional transmissions, then 7 of the 10 new messages could be sent immediately, while the other 3 might be sent at a later time when there is room in the multicast table. This delay could take many seconds—possibly on the order of 8 or 10 seconds. Of course it is undesirable if 7 of 10 commands are sent immediately, and 3 are sent 8 seconds later or are not transmitted at all.

Many mesh networks employ separate multicast and unicast tables. The multicast tables in such systems may be much smaller than the unicast table since multicasting messages often requires more system resources than unicasting messages and so are limited. The number of multicast messages that can be sent over a network in a specified period of time may furthermore be limited by the network specification. For example, the ZigBee specification limits the number of multicast messages that can be transmitted in a period of time. Such limitations on multicast messages may create network problems, such as user-noticeable delays if the multicast transmission rate limit is exceeded.

Thus there is a need for systems, apparatuses, and methods to efficiently place messages in unicast and multicast tables to efficiently transmit those messages to other devices in the network.

Embodiments of dynamic virtual groups apparatuses, systems and methods minimize network delays.

Embodiments of dynamic virtual groups apparatuses, systems, and methods use network resources more efficiently.

Embodiments of dynamic virtual groups apparatuses, systems and methods unicast information to multiple devices rather than multicast that information to multiple devices in a single message.

SUMMARY OF THE INVENTION

Embodiments of network traffic management apparatuses, systems, and methods are directed to systems, apparatuses, and methods for managing network traffic. In accordance with one embodiment of network traffic management apparatuses, systems, and methods, a device includes a network communication device for communicating data to a plurality of remote devices and a processor coupled to the network communication device. The processor includes instructions which, when executed by the processor, cause the processor to establish a building zone corresponding with a physical space in the building, determine how many networked devices are in the building zone, determine a current multicast use level, establish a virtual group threshold based on a current portion of a network multicast capacity that is being used, and unicast a message to be transmitted to a plurality of networked devices in the building zone when the number of networked devices in the building zone is less than the virtual group threshold.

In accordance with another embodiment of network traffic management apparatuses, systems, and methods, a network traffic management system includes a plurality of actuating network devices in a building zone receiving a message by way of unicast communication, each of the plurality of network devices including a network communication device for receiving data from a remote device and a processor coupled to the network communication device. The processor of each of those actuating network devices includes instructions which, when executed by the processor, cause the processor to receive a unicast message when the plurality of actuating networked devices is fewer than a virtual group threshold created based on a current portion of a network multicast capacity that is being used.

In accordance with another embodiment of network traffic management apparatuses, systems, and methods, a network traffic management method includes establishing a building zone corresponding with a physical space in the building, determining how many networked devices are in the building zone, determining a current multicast use level, establishing a virtual group threshold based on a current portion of a network multicast capacity that is being used, and unicast transmitting a message to be transmitted to a plurality of networked devices in the building zone when the number of networked devices in the building zone is less than the virtual group threshold.

Accordingly, the present invention provides solutions to the shortcomings of prior network traffic management apparatuses, systems, and methods. Those of ordinary skill in the art will readily appreciate, therefore, that those and other details, features, and advantages of the present invention will become further apparent in the following detailed description of the preferred embodiments of the invention.

BRIEF DESCRIPTION OF THE DRAWINGS

The accompanying drawings, which are incorporated herein and constitute part of this specification, include one or more embodiments of the invention, and together with a general description given above and a detailed description given below, serve to disclose principles of embodiments of broadcast transmission control apparatuses, systems, and methods.

DETAILED DESCRIPTION OF THE INVENTION

Reference will now be made to embodiments of broadcast transmission control apparatuses, systems, and methods, examples of which are illustrated in the accompanying drawings. Details, features, and advantages of those broadcast transmission control apparatuses, systems, and methods will become further apparent in the following detailed description of embodiments thereof. It is to be understood that the figures and descriptions included herein illustrate and describe elements that are of particular relevance to network traffic management apparatuses, systems, and methods, while eliminating, for purposes of clarity, other elements found in typical computerized access systems.

Any reference in the specification to "one embodiment," "a certain embodiment," or any other reference to an embodiment is intended to indicate that a particular feature, structure or characteristic described in connection with the embodiment is included in at least one embodiment and may be utilized in other embodiments as well. Moreover, the appearances of such terms in various places in the specification are not necessarily all referring to the same embodiment. References to "or" are furthermore intended as inclusive so "or" may indicate one or another of the ored terms or more than one ored term.

Figure 1:
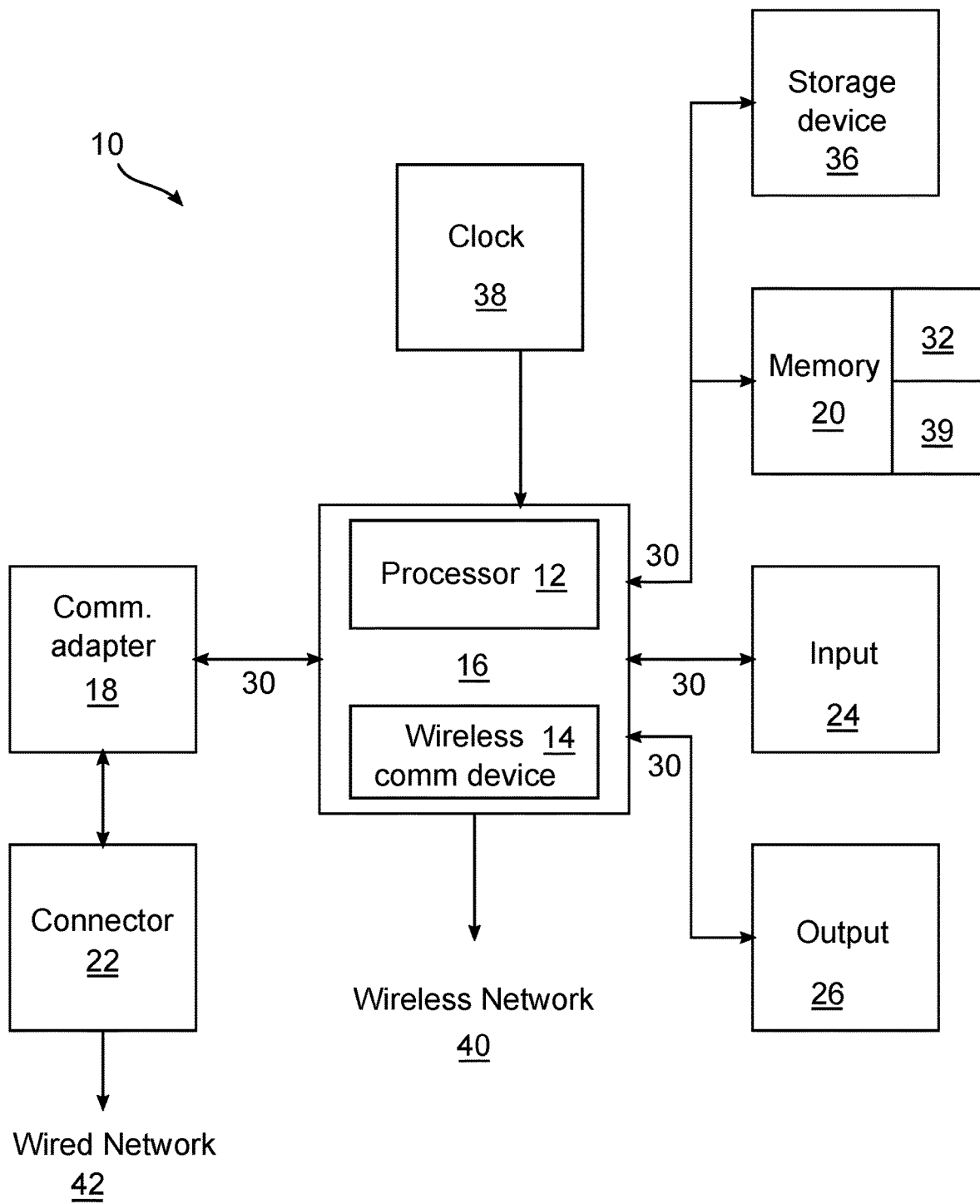
FIG. 1 illustrates an embodiment of a gateway that performs network traffic and processor activity management in one embodiment of the invention.

FIG. 1 illustrates an embodiment of a gateway 10 that performs an embodiment of dynamic virtual groups. The gateway 10 includes a processor 12 and a wireless network communication device 14, which may be a ZigBee® network communication device. The processor 12 and wireless communication device 14 may be combined in a controller 16, which may be a microcontroller. The gateway 10 may also include a communication adaptor 18, memory 20, a communication adaptor port or connector 22, one or more input devices 24, diagnostic output devices 26, and a clock 38.

The gateway 10 may furthermore facilitate communications across networks including a wireless network 40 and a wired network 42.

It should be recognized that the gateway 10 may have fewer components or more components than shown in FIG. 1. For example, if an input device 24 or output device 26 is not desired, such a device may not be included in the gateway 10.

The elements, including the processor 12, memory 20, data storage device 36, output 26, input 24, and communication adaptor 18 related to the gateway 10 may communicate by way of one or more communication busses 30. Those busses 30 may include, for example, a system bus or a peripheral component interface bus.

The memory 20 may, for example, include random-access memory (RAM), flash RAM, dynamic RAM, or read only memory (ROM) (e.g., programmable ROM, erasable programmable ROM, or electronically erasable programmable ROM) and may store computer program instructions and information. The memory 20 may furthermore be partitioned into sections including an operating system partition 32 where system operating instructions are stored, and a data partition 39 in which data is stored.

The processor 12 may be any desired processor and may be a part of a controller 16, such as a microcontroller, may be part of or incorporated into another device, or may be a separate device. The processor 12 may, for example, be an Intel® manufactured processor or another processor manufactured by, for example, AMD®, DEC®, or Oracle®. The processor 12 may furthermore execute the program instructions and process the data stored in the memory 20. In one embodiment, the instructions are stored in the memory 20 in a compressed or encrypted format. As used herein the phrase, "executed by a processor" is intended to encompass instructions stored in a compressed or encrypted format, as well as instructions that may be compiled or installed by an installer before being executed by the processor 12.

The data storage device 36 may, for example, be non-volatile battery backed static random-access memory (RAM), a magnetic disk (e.g., hard drive), optical disk (e.g., CD-ROM) or any other device or signal that can store digital information. The data storage device 36 may furthermore have an associated real-time clock 38, which may be associated with the data storage device 36 directly or through the processor 12 or controller 16. The real-time clock 38 may trigger data from the data storage device 36 to be sent to the processor 12, for example, when the processor 12 polls the data storage device 36. Data from the data storage device 36 that is to be sent across the network 40 or 42 through the processor 12 may be sent in the form of messages in packets. Those messages may furthermore be queued in or by the processor 12.

The communication adaptor 18 perm its communication between the gateway 10 and other gateways 11 (depicted in FIG. 2), routers 72 (depicted in FIG. 2), devices, or nodes coupled to the communication adaptor 18 at the communication adaptor connector 22. The communication adaptor 18 may be a network interface that transfers information from a node such as a router 72, a terminal device 74 or 75 (depicted in FIG. 2), a general purpose computer 76 (depicted in FIG. 2), a user interface 77 (depicted in FIG. 2) or another gateway 11 to the gateway 10 or from the gateway 10 to a node 11, 72, 74, or 76. The communication adaptor 18 may be an Ethernet adaptor or another adaptor for another type of network communication. It will be recognized that the gateway 10 may alternately or in addition be coupled directly to one or more other devices through one or more input/output adaptors (not shown).

The input device 24 and output device 26 may couple the gateway 10 to one or more input or output devices such as, for example, one or more pushbuttons and diagnostic lights or displays. It will be recognized, however, that the gateway 10 does not necessarily need to have an input device 24 or an output device 26 to operate. Moreover, the data storage device 36 may also not be necessary for operation of the gateway 10 as data may be stored in memory, for example. Data may also be stored remotely and accessed over a network, such as the Internet.

The processor 12 may include or be attached to the real-time clock 38 such that the processor 12 may read or retrieve scheduled events from the data storage device 36 when or subsequent to real-time clock 38 indication that the scheduled time has arrived. Those retrieved scheduled events may then be transmitted across the network 40 or 42. One or more of such scheduled events may trigger messages to be sent at a time or in a cycle and, where more than one message is triggered to be sent across the network 40 or 42, those messages may form a queue. The queue may be created at the microprocessor 16.

Figure 2:
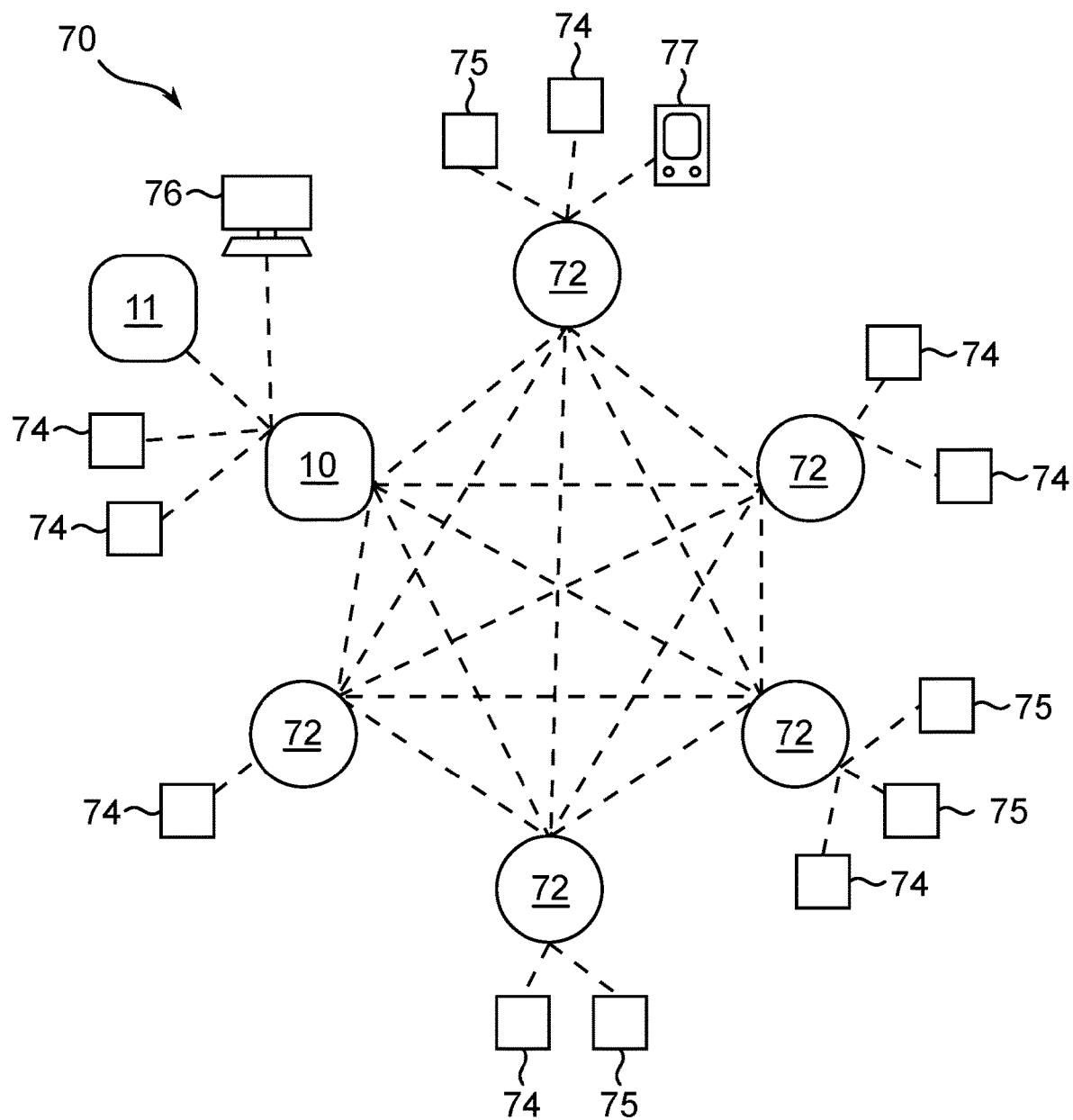
FIG. 2 illustrates an embodiment of a network in an embodiment of network traffic management.

FIG. 2 illustrates a network 70 in an embodiment of dynamic virtual groups. The network 70 includes a gateway, such as the gateway 10 illustrated in FIG. 1, one or any desired number of additional gateways 11, one or more routers 72, a plurality of end devices 74 and 75, and one or more general purpose computers 76 and user interfaces 77. The additional gateways 11 may be like the gateway 10 illustrated in FIG. 1, or may be of various configurations. The end devices may be actuated devices 74 such as lighting fixtures, blinds, or various other devices that are controlled by or in the network 70 and sensors 75 such as manually operated switches, light level sensors, and other ambient condition sensors.

Messages to be transmitted across the network 40, 42, or 70 may enter one or more queues, such as a broadcast queue for messages to be transmitted to all devices on the network, a multicast queue for messages to be transmitted to more than one but not all devices on the network, and a unicast queue for messages to be transmitted to one device on the network. Each queue may be a packet queue where packets making up a message are queued for transmission across the network 40, 42, or 70. Messages or packets may be placed in that queue by the processor 12. Those messages and packets to be transmitted across the network may furthermore come from different places or processor 12 functions including scheduled events read from the data storage device 36 by the processor 12 and events or data created by the processor from, for example, sensed data received from a sensor 75 coupled to the network 40, 42, or 70.

The messages transmitted across the network 40, 42, or 70 may include data to be used by one or more of the receiving nodes 72, 74, or 75 or events to be actuated at one or more of the end device receiving nodes 72, 74, or 75 such as turning a light on or off or energizing a motor on a motorized window shade or blind.

In an embodiment of queue operation, only as many as a predetermined number of messages are permitted to be transmitted across the network in a predetermined message transmission time period. The predetermined message transmission time period may, for example, be a single program cycle or another desired period of time. In an embodiment where more messages are to be sent than that predetermined number of messages, the additional messages are placed in the queue.

Figure 3:
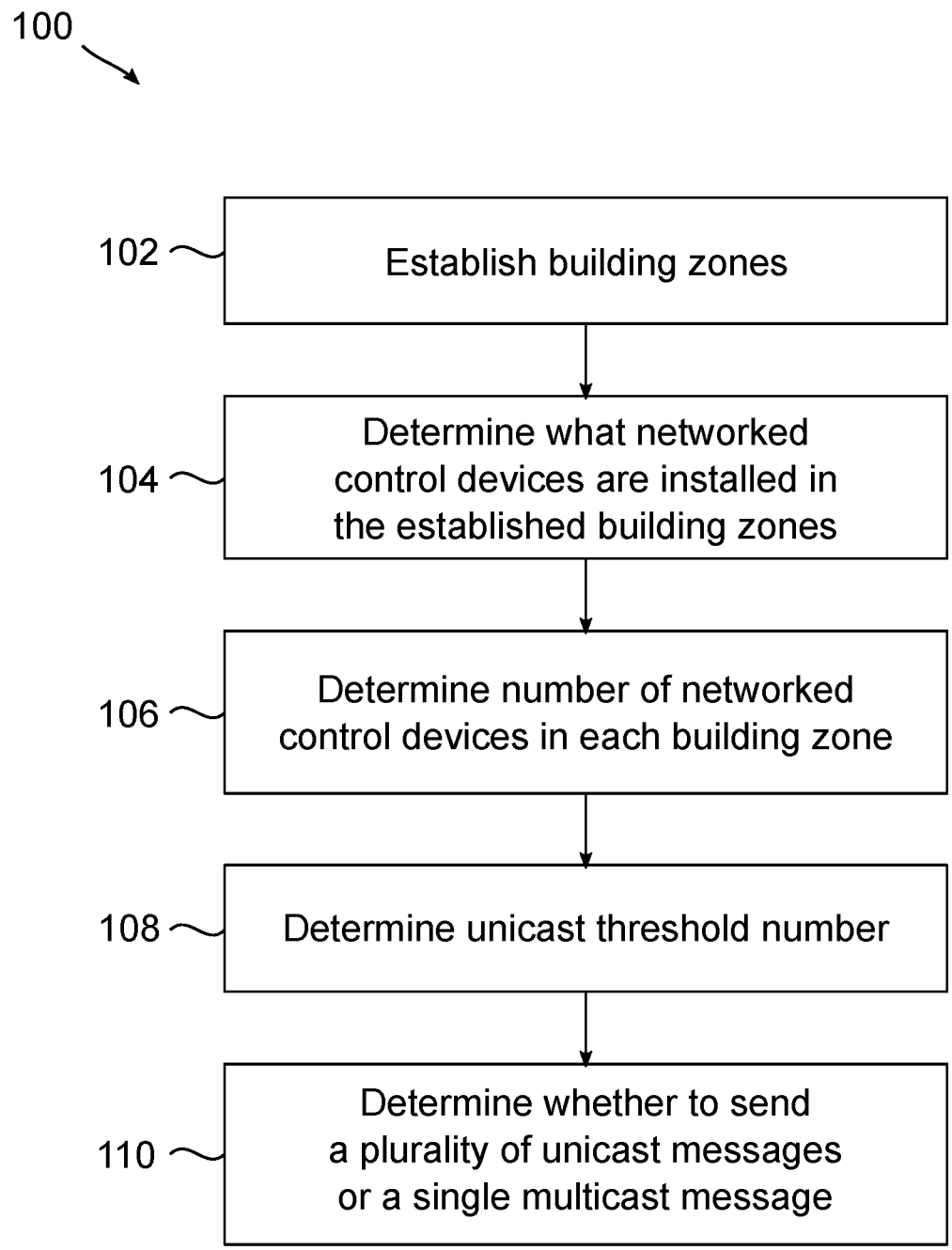
FIG. 3 illustrates an embodiment of a method of dynamic virtual group operation.

FIG. 3 illustrates a method of dynamic virtual group operation 100. That embodiment of dynamic virtual group operation 100 may be executed on the gateway 10 illustrated in and described in connection with FIG. 1. That method of dynamic virtual group operation 100 may furthermore be performed on a network such as the network 70 illustrated in and described in connection with FIG. 2. In this embodiment, dynamic virtual groups are formed of devices that have related operation or location.

Because the network bandwidth associated with multicast messages may be significantly larger than the network bandwidth associated with unicast messages, it may be more efficient to unicast information to multiple network control devices 74, 75 than to multicast that information to those to network control devices 74, 75. Accordingly, dynamic virtual groups 100 may operate to replace a multicast message with a plurality of unicast messages where transmitting the plurality of unicast messages may be more bandwidth efficient for the network than transmitting a multicast message or may provide a better user experience.

User experience can be affected by the use of multicast messages versus multiple unicast messages. For example, a multicast message may be received at very nearly the same time by all the network control devices 74, 75 to which the multicast message is directed. Thus, for example, where those multicast receiving network control devices 74, 75 actuate lighting fixtures, a user may see all those lighting fixtures be energized or de-energized nearly simultaneously. When those network control devices 74, 75 receive separate unicast messages, however, a user may see the lighting fixtures actuated by those network control devices 74, 75 be energized or de-energized sequentially with a short delay between the actuation of each light. This sequential or "popcorn" effect is generally regarded as undesirable, especially when affecting a large group of lights in a room or continuous space.

The sequential actuation of devices by networked control devices 74, 75 that often occurs when unicast messages are transmitted to networked control devices 74, 75 is sometimes beneficial. For example, if substantial loads are being energized, inrush current may be spread out over time, thereby beneficially reducing inrush experienced by the building, building zone, or a separately metered portion of a building.

That method 100 establishes building zones at 102. A building zone may be a floor, a space leased by a tenant, an area in which a particular business function is performed, or any other natural building division. The zones may be established by a user, by a lighting control professional, from architectural drawings, by an automated method that divides a building or space in a building into building zones, or otherwise as desired. For example, a user may create zoned spaces in the building graphically on computer generated floor plan diagrams or otherwise.

That method of dynamic virtual group operation 100 determines what networked control devices 74, 75, are installed in the established building zones at 104. The number of networked control devices 74, 75 in each building zone is determined at 106. The number of control devices 74, 75 in each established zone may be determined by counting networked control devices 74, 75 that are installed in the zone manually or, alternately, an automated method may be employed to group networked devices 74, 75 zones having boundaries established in a computer and count the number of control devices 74, 75 in each zone. For example, a network may automatically poll networked control devices 74, 75 and determine the building zone in which each networked control device 74, 75 is installed. The network may then automatically determine which networked control devices 74, 75 are located in each zone, and count the number of networked control devices 74, 75 in each zone. Other methods of assigning networked control devices 74, 75 to zones and counting the number of networked control devices 74, 75 in a zone may also be employed as desired.

At 108, a unicast threshold number is determined. That threshold corresponds to a number of devices in a group above which a multicast message will be multicast to devices. Thus, if a group contains the threshold number of devices or fewer than the threshold number of devices, a multicast message will be separately unicast to each device to receive a multicast message in that group.

Using virtual group operation 100, when a message is to be transmitted to a plurality of devices in a zone, a determination as to whether to send a plurality of unicast messages or a single multicast message is made at 110. The number of devices in the zone is compared to the unicast threshold to determine whether that message will be unicast to each zone device to receive a message or will be multicast to all those devices.

Where the group of devices is greater than the unicast threshold, a message to be transmitted to multiple devices in that group will be multicast to those devices. Where a group of devices is less than or equal to the predetermined threshold, a message to be transmitted to multiple devices in the group will be unicast to those devices. In that way, a small number of unicast messages will replace a multicast message when only a small number of devices are in a group, which may be more efficient for the network under certain circumstances than sending a single multicast message. On the other hand, where there are many devices in a group, a traditional multicast message will be sent because transmitting a multicast message may be more efficient on the network than sending a large number of unicast messages in certain circumstances.

The unicast threshold that determines whether a grouping of devices is small enough to unicast messages to multiple devices in the group or large enough to be better suited to multicasting may, furthermore, be determined dynamically.

Figure 4:
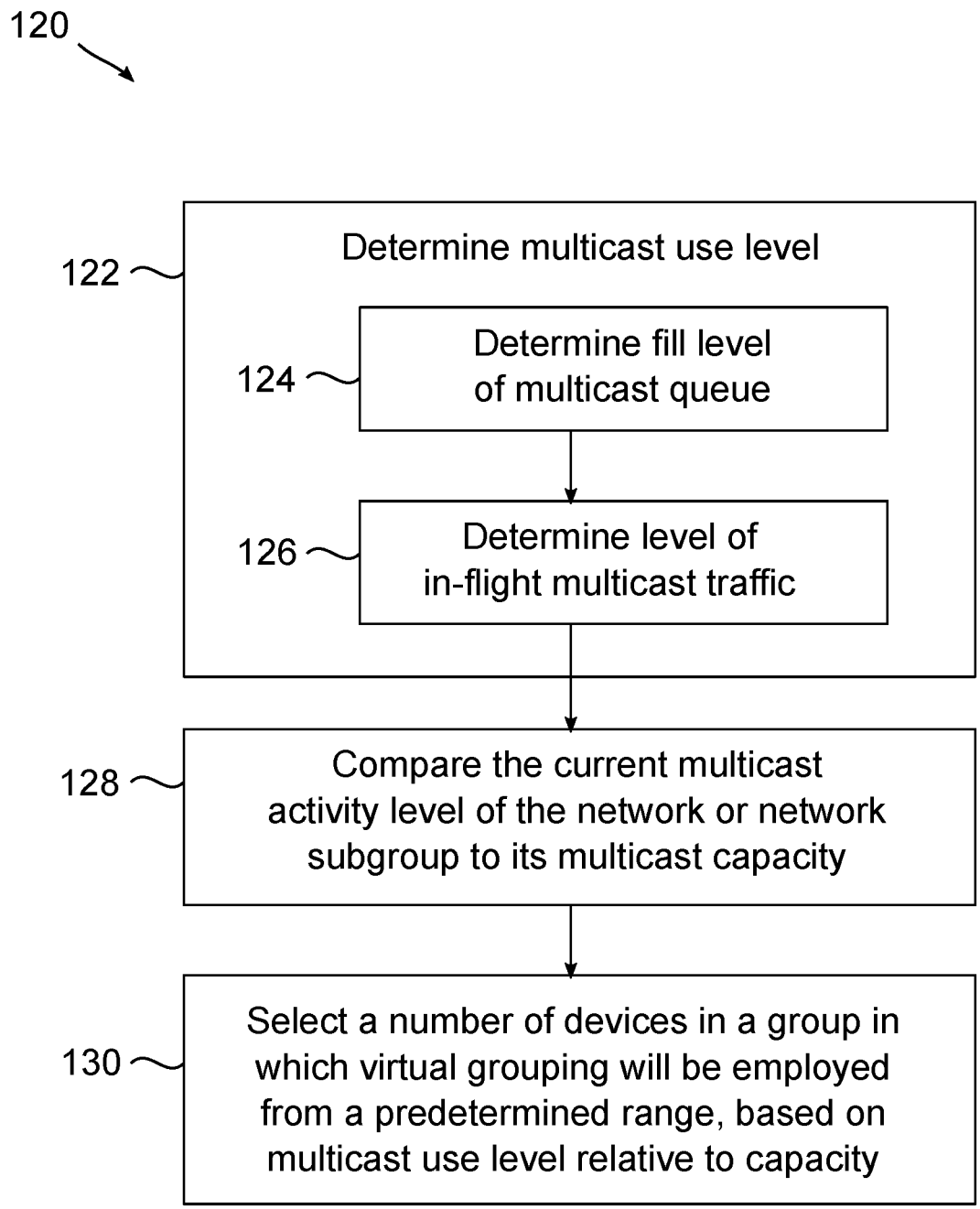
FIG. 4 illustrates an embodiment of a method of limiting the number of scheduled events a processor reads from a data storage device.

FIG. 4 illustrates a method of dynamically determining a unicast threshold 120. Dynamic thresholding determines how busy the network or relevant portion of the network is before determining the dynamic threshold for future multicast messages at 122. Queue fill is the multicast demand considered at 124 and current level of multicast transmission, or multicast in-flight, is the multicast demand considered at 126. Those two methods 124 and 126 and other methods of determining the level of multicast transmission demand that exists in a network or relevant portion of a network may be used separately or together to establish multicast use level at 122.

A busy network or network sub-group, particularly with regard to multicast message transmission, may be classified as such when the network or group is queuing or transmitting messages near its maximum capacity and any metric that establishes the activity level in that network or network subgroup may be employed to establish multicast use level at 128. That metric may compare the use of the network or sub-network to the capacity of that network or sub-network to transmit multicast messages. The capacity of the network or network sub-group may alternately be known, such that the multicast use level may be determined and the network or sub-network activity level may be determined directly from current or scheduled multicast use level.

Dynamic thresholding selects a number of devices in a group in which virtual grouping will be employed from a predetermined range at 130 based on the current or scheduled multicast use level. Thus, the number of devices in a group that may use virtual group unicast messages sent to each receiving device rather than a multicast message to all devices receiving that message in that group may be a range. In one example, the dynamic threshold range is 10 to 20 devices, such that when the network or the group subnetwork is busy, groups containing 20 or fewer devices use virtual group unicasting and when the network or the group subnetwork is not busy, only groups having 10 or fewer devices may use virtual group unicasting. The dynamic threshold will determine where in the 10 to 20 device range virtual grouping of unicast messages will be used. Use of dynamic thresholding in such a range will minimize the likelihood that a multicast queue will become overtaxed, thereby having a slow response or entirely losing one or more messages.

In this example, the system compares the current multicast activity level of the network or network subgroup to its multicast capacity at 128 as follows: if a multicast table has capacity to queue ten messages and it currently contains 3 messages, then the table is determined to be 3/10 or 30% filled at 124. If the capacity for multicast messages in transmission at a given time is two and one message is currently being transmitted, then the current transmission level is determined to be ½ or 50% at 126. In an embodiment where queue fill at 124 and in-flight at 126 are both used to determine the current multicast activity level, the total capacity used includes the 3 queued messages in the table and the one message currently transmitted for a total of four and the system capacity is ten queued messages plus the capacity to transmit two messages for a total of 12. The portion of the capacity that is used is determined at 128 to be 4/12 or 33%.

The system will then apply the portion of the capacity currently being used to the range of devices used as the threshold range at 130. In the example where the range of devices is 10-20 networked devices and the currently used capacity is 33% of the range, that application provides a threshold of 13.3 devices, such that network groups having 13 or fewer devices will have multicast messages to devices in that building zone grouped as unicast messages and network groups having 14 or more devices will have multicast messages sent within that building zone transmitted as multicast messages.

The threshold range may be viewed as having two parts, (i) the minimum number of devices (ten in the prior example) such that groups of the minimum number or fewer networked devices will always unicast their multicast messages to those devices; and (ii) the varying range (11-20 in the prior example). Applying the 33% system usage of the example to the varying range of 11-20 and adding the minimum, provides a product of 13.3 devices for the current threshold. Thus, in that embodiment, a group that includes 13 or fewer networked devices will convert its multicast messages to a plurality of unicast messages to be sent individually to devices in that group and a group that includes 14 or more devices will multicast messages to devices in those groups. Accordingly, if in the example a message is to be sent to some or all devices in a building zone to energize lighting fixtures connected to those devices because a time to energize lighting has arrived, a building zone of 13 or fewer devices will transmit that light energization message to the appropriate devices in that group by way of a unicast message sent to each device that is to energize a light in that group and a group of 14 or more devices will transmit that light energization message to the appropriate devices in that group by way of a multicast message transmitted to every device that is to actuate its connected lighting fixture.

Thus, dynamic thresholding of virtual group formation enables the system to convert more multicast messages to multiple unicast messages when the network or network subsystem is busy with multicast messages. For example, virtual groups of unicast messages can be used in place of multicast messages when a large number of multicast messages are currently being transmitted or in-flight, when a large number of multicast messages are currently queued for transmission in a multicast table, or when the total number of currently transmitted and queued multicast messages is large.

In another example, where:

The minimum virtual group activation threshold (MIN) is determined;

The maximum virtual group activation threshold (MAX) is determined;

The number of multicast messages queued (Q) is determined; and

The number of multicast messages in-flight (F) or that have been transmitted in the last 10 seconds is determined; then $$\text{The virtual group activation threshold} = \text{minimum}((MIN+((Q+F)*2)), MAX).$$

In that example, where MIN=3, MAX=15, Q=3, and F=3, the virtual group activation threshold would be 3+(3+2)*2=13. With a virtual group activation threshold of 13, zones of networked devices having 13 or fewer devices will convert their multicast messages to a plurality of unicast messages to be sent individually to devices in that group and groups that includes 14 or more devices will multicast messages to devices in those groups.

While the present invention has been disclosed with reference to certain embodiments, numerous modifications, alterations, and changes to the described embodiments are possible without departing from the scope of the present invention, as defined in the appended claims. Accordingly, it is intended that the present invention not be limited to the described embodiments, but that it have the full scope defined by the language of the following claims, and equivalents thereof.

What is claimed is:

1. A network traffic management device, comprising:
   a network communication device for communicating data to a plurality of remote devices; and
   a processor coupled to the network communication device, the processor including instructions which, when executed by the processor, cause the processor to:
   establish a building network zone corresponding with a physical space in a building;
   determine how many networked devices are physically located in the building network zone;
   determine a current number of multicast messages queued for transmission;
   establish a virtual group threshold number of devices physically located in the building network zone based on the current number of multicast messages queued for transmission;
   unicast a message to a plurality of networked devices physically located in the building network zone when the number of networked devices in the building network zone is less than or equal to the virtual group threshold; and
   multicast transmit the message to that same plurality of networked devices physically located in the building network zone when the number of networked devices in the building network zone is more than the virtual group threshold.

2. The network traffic management device of claim 1, wherein the building zone is at least one of a floor of the building, a space leased by a tenant, and an area in which a particular business function is performed.

3. The network traffic management device of claim 1, further comprising a real-time clock coupled to the processor.

4. The network traffic management device of claim 3, further comprising memory coupled to the processor.

5. The network traffic management device of claim 4, further comprising a data storage device coupled to the processor.

6. The network traffic management device of claim 1, wherein the network encompasses a plurality of building zones.

7. The network traffic management device of claim 1, wherein the network is the building zone.

8. The network traffic management device of claim 1, wherein the current multicast use level includes the number of multicast messages currently being transmitted.

9. The network traffic management device of claim 1, wherein the current multicast use level includes the number of multicast messages queued for transmission.

10. The network traffic management device of claim 5, wherein the real-time clock triggers data retrieval from the data storage device, the retrieved data to be transmitted in the message;
    the virtual group threshold number of devices in the physical space building zone is within a predefined range of devices; and
    the virtual group threshold number of devices includes the number of multicast messages currently being transmitted and the number of multicast messages queued for transmission.

11. The network traffic management device of claim 1, wherein determining a current number of multicast messages queued for transmission includes comparing the current number of multicast messages queued for transmission in the building zone to the multicast capacity of the building zone.

12. A network traffic management system, comprising:
a plurality of actuating network devices in a building zone corresponding with a physical space in a building receiving a message by way of unicast communication transmitted to each of the plurality of actuating network devices when the number of network devices in the building zone is less than or equal to a virtual group threshold, the virtual group threshold determined based on a current number of multicast messages queued for transmission and receiving that message by way of a multicast communication transmitted to each of the plurality of actuating network devices when the number of network devices in the building zone is greater than the virtual group threshold, each of the plurality of network devices comprising:
a network communication device for receiving data from a remote device; and
a processor coupled to the network communication device, the processor including instructions which, when executed by the processor, cause the processor to receive the unicast or multicast message.

13. The network traffic management system of claim 12, wherein the building zone is at least one of a floor of the building, a space leased by a tenant, and an area in which a particular business function is performed.

14. The network traffic management system of claim 12, wherein the current number of multicast messages queued for transmission includes the number of multicast messages currently being transmitted.

15. A method of network traffic management, comprising:
establishing a building zone corresponding with a physical space in the building;
determining how many networked devices are in the building zone;
determining a current number of multicast messages queued for transmission;
establishing a virtual group threshold number of devices in the building zone based on a current number of multicast messages queued for transmission;
unicast transmitting a message to a plurality of networked devices in the building zone when the number of networked devices in the building zone is less than or equal to the virtual group threshold; and
multicast transmitting the message to that same plurality of networked devices in the building zone when the number of networked devices in the building zone is more than the virtual group threshold.

16. The method of network traffic management of claim 15, wherein the building zone is at least one of a floor of the building, a space leased by a tenant, and an area in which a particular business function is performed.

17. The method of network traffic management of claim 15, wherein the current number of multicast messages queued for transmission includes the number of multicast messages currently being transmitted.

18. The method of network traffic management of claim 15, wherein the current number of multicast messages queued for transmission includes the number of multicast messages currently being transmitted and the number of multicast messages queued for transmission.

* * * * *